United States Patent [19]
Niznik

[11] 3,875,237
[45] Apr. 1, 1975

[54] PREPARATION OF FLUORENONE
[75] Inventor: George E. Niznik, Elnora, N.Y.
[73] Assignee: General Electric Co., Schenectady, N.Y.
[22] Filed: Mar. 21, 1974
[21] Appl. No.: 453,284

[52] U.S. Cl. ................................................. 260/590
[51] Int. Cl. ............................................. C07c 49/76
[58] Field of Search .................................... 260/590

[56] References Cited
UNITED STATES PATENTS
3,260,570  7/1966  Russell ........................... 260/607 A FOREIGN PATENTS OR APPLICATIONS
245,758  11/1969  U.S.S.R. ............................. 260/590

*Primary Examiner*—Daniel D. Horwitz
*Attorney, Agent, or Firm*—Jerome C. Squillaro; Joseph T. Cohen

[57] ABSTRACT

Fluorenone can be prepared from fluorene by contacting a solution of the latter in dimethyl sulfoxide with molecular oxygen in the presence of a small amount of an alkali-metal hydroxide.

3 Claims, No Drawings

PREPARATION OF FLUORENONE

This invention is concerned with a process for preparing fluorenone from fluorene. More particularly, the invention relates to a process for obtaining fluorenone in good yields by the oxidation of fluorene, which process comprises contacting a solution of fluorene in dimethyl sulfoxide (DMSO) with molecular oxygen in the presence of an alkali-metal hydroxide, wherein the alkali-metal hydroxide is present in an amount less than 5 mol percent based on the molar concentration of the fluorene.

Fluorenone having the formula

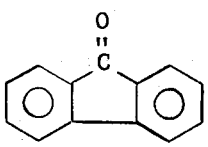

has been prepared in the past by various methods. However, with the exception of methods employing oxidative processing, prior art methods have not been conducive to commercialization. One of the oxidative processes previously described involved the oxidation of fluorene in an aqueous alkaline emulsion at elevated temperatures and pressures as described in the Russian article of Sobolera, et al., Zh. Prikl. Khim, 43, 1787 (1970). However, this process suffers from the fact that several carboxylic acids are also obtained in this process. The fact that substantial amounts of by-products are also obtained results in a decrease in the yield of the fluorenone.

U.S. Pat. No. 3,260,570 describes the oxidation of organic compounds, including fluorene with molecular oxygen in a dimethyl sulfoxide solvent employing substantial proportions of an alkali-metal hydroxide, oxide or alkoxide, for instance, potassium tertiary butoxide, potassium hydroxide, etc. However, in this patent in order to increase the stability of the dimethyl sulfoxide and reduce its tendency to decompose in the presence of alkali-metal alkoxides or hydroxides and molecular oxygen, it has been necessary to use tertiary butyl alcohol in large amounts. Moreover, in the only example appearing in this patent, namely, Example 5 directed to the treatment of fluorene, instead of obtaining fluorenone, one obtains a sulfoxide derivative of fluorenone having the formula

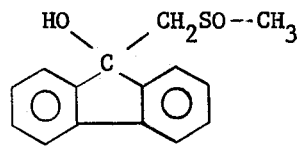

I have now discovered a process whereby I can oxidize fluorene to fluorenone in good yields wherein relatively no by-products are formed, and whereby no alcohol is required to inhibit decomposition of the dimethyl sulfoxide. In accordance with my invention, I contact a solution of the fluorene in dimethyl sulfoxide with molecular oxygen (air can be used if desired) employing an alkali-metal hydroxide catalyst in a relatively small amount, specifically in a positive amount up to a maximum of about 5 mol percent of the alkali-metal hydroxide based on the molar concentration of the fluorene. Usually, amounts ranging from about 0.01 to 1 mol percent of the alkali-metal hydroxide are adequate. As these smaller amounts are used, it will be found that the dimethyl sulfoxide will not form the contaminating by-products which the invention in the above patent intended to avoid, and the dimethyl sulfoxide is so pure that it can be recovered and recycled for use again in my process. By the use of the unusually small amount of alkali-metal hydroxide, the effective pH is maintained sufficiently high so that the fluorenide ion is formed while the dimethyl sulfoxide anion is suppressed.

Among the alkali-metal hydroxides which may be employed are, for instance, sodium hydroxide, potassium hydroxide, lithium hydroxide, etc. Because it is relatively inexpensive, sodium hydroxide is preferred. The amount of the alkali-metal hydroxide used should be kept at a very low level. Generally, I have found that positive amounts, even as low as 0.01 mol percent, up to a maximum of 4 to 5 mol percent are advantageously employed, the mol percent being based on the molar concentration of the fluorene.

In carrying out the reaction, the fluorene is dissolved in the dimethyl sulfoxide which can be commercial grade quality containing about 1% water. Solutions of the fluorene in the dimethyl sulfoxide can be varied widely but generally, for convenience, the solution comprises, on a weight basis, about 0.1 to 1 part of the fluorene, per part of the dimethyl sulfoxide.

Although molecular oxygen is preferred since it is able to effect faster reaction, it should be noted that air is also acceptable as a source of oxygen but of course would require larger amounts. Because of the inconvenience and the presence of deleterious constituents in the air, such as carbon dioxide, molecular oxygen is preferred. The rate of passage of oxygen can be varied widely and is not critical. Anywhere from 50 to 500 ml of oxygen or more per minute per mol fluorene may be used.

The temperature of the reaction can be varied widely but it is advantageously maintained below 100°C. Since the reaction is exothermic and may lead to runaway conditions, cooling of the reaction mixture may be required. Temperatures as low as 15°C. may be employed and generally the preferred range is from ambient (about 25° to 30°C.) to around 70° to 80°C.

In carrying out the reaction, the alkali-metal hydroxide, advantageously (though not necessarily) in the form of a concentrated aqueous solution, for instance, about a 10 to 50 weight percent aqueous solution is added to the dimethyl sulfoxide solution of the fluorene. This is done while stirring is maintained and oxygen is being passed through the solution of the dimethyl sulfoxide. The alkali-metal hydroxide is added slowly to the dimethyl sulfoxide solution of the fluorene in order to maintain control of the reaction and to prevent undesirable by-product formation and reduction in yield. I have found that incremental additions of the alkali-metal hydroxide are quite effective in maintaining control of the reaction and at the same time, repressing the formation of undesirable by-products or any reduction in yield. Thus, the alkali-metal hydroxide solution can be divided in from 2 to 4 essentially equal weight parts and added at successive stages in the reaction.

In order that those skilled in the art may better understand how the present invention may be practiced, the following examples are given by way of illustration and not by way of limitation. In the examples, oxygen was introduced continuously after each incremental addition of base.

EXAMPLE 1

Into a solution of 50 grams (0.301 mol) fluorene in 200 ml (220 grams) dimethyl sulfoxide, was bubbled oxygen introduced through a fritted tube at the rate of about 150 ml/min. Thereafter, 0.1 ml (0.0019 mol) of 50% aqueous sodium hydroxide was added to the stirring mixture. External cooling was required in order to maintain the temperature at between 25° – 30°C. After stirring the mixture for an hour, analysis showed that 28% conversion of the fluorene to fluorenone had occurred; thereafter another 0.1 ml of the above-mentioned aqueous base was added with stirring while at the same time passing oxygen continuously through the solution. After 4 hours, and after a total of four 0.1 ml additions of the aqueous sodium hydroxide had been incorporated, it was found that the reaction had gone to approximately 97% conversion to fluorenone. A final 0.1 ml addition of the alkali-metal hydroxide solution brought the reaction to 99.8% conversion after a total of five hours stirring. The mixture was precipitated into 3 liters of water and the formed slurry was stirred at 60°C. for 4 hours, cooled, filtered, and dried to yield 53.13 grams (0.295 mol) fluorenone having a melting point of 74°–78.5°C.

EXAMPLE 2

Employing the similar procedure as in Example 1, 100 grams (0.602 mol) fluorene in 200 ml dimethylsulfoxide were treated with oxygen and 0.05 ml (0.001 mol) of 50% aqueous sodium hydroxide solution. The temperature was allowed to rise without control and after one hour, it was found that conversion to the fluorenone was about 33% complete and the temperature had risen to about 59°C. At this point, 0.2 ml of the sodium hydroxide solution was again added, but this time the temperature rose to 87° in 4 minutes so that external cooling was required to keep the temperature between 85°–90°C. Thereafter, because the oxygen consumption was so large, the oxygen addition rate was doubled to 230 ml/min in order to maintain a slight positive pressure in the reaction vessel. One more addition of base, 0.1 ml, was required to obtain essentially quantitative conversion to the fluorenone, an elapsed time of 3 3/4 hours was used and the total base employed was 0.35 ml (0.0067 mol). Gaseous HCl was added to the mixture until it was slightly acidic. The dimethylsulfoxide and water were stripped from the reaction mixture under a 30 mm vacuum, and the residue, which solidified after cooling, was found to be essentially pure fluorenone having a melting point of 74°–79°C. in approximately a quantitative yield.

EXAMPLE 3

Employing a similar procedure as in Examples 1 and 2, 453.6 grams (2.73 mols) fluorene was dissolved in 454 grams dimethylsulfoxide at a temperature of about 100°C. The reaction vessel was cooled to 80°C. and oxygen was introduced at the rate of about 300 ml/min. Portions of 0.2 ml (0.0038 mol) each of 50% aqueous sodium hydroxide solution were added at about 10 to 15 minute intervals. A cold temperature bath was used occasionally to maintain the temperature at around 80°C. After 2 3/4 hours, the reaction was 86% complete. However, larger portions (0.3 to 0.5 ml) of the sodium hydroxide solution were then used at the same time intervals to hasten the completion of this reaction. Thus, a total time of 4 hours was required and a total of 5.0 ml (0.095 mol) base was employed. Hydrogen chloride was added to neutralize the mixture and DMSO was removed by distillation throught a 20 cm. vigreux column followed by flash distillation of the fluorenone under vacuum at 200°C. to give 463.3 grams fluorenone in about a 94.2% yield.

The following Table 1 gives some idea of the purity of fluorenone obtained in accordance with my process and also the yields which are possible. The heading "Fluorenone Purity" recites the percentages of inert impurities A and B which are normally found in practical and technical grade fluorene as well as in reagent grade fluorenone. The impurity C is believed to be fluorenol. Both the technical grade and the reagent grade fluorenones recited in the table were obtained from Aldrich Chemical Company.

TABLE 1

| Origin Fluorenone | M.P.°C | % Yield Fluorenone | Fluorenone Purity | | | % Fluorene |
|---|---|---|---|---|---|---|
| | | | % A | % B | % C | |
| Example 1 (ppt. in H$_2$O) | 74–78.5 | 97.67 | 0.14 | 1.54 | 0.45 | 0.15 |
| Example 2 (stripped DMSO) | 74–79 | 97.98 | 1.35 | 0.67 | 0.00 | 0.00 |
| Example 3 (flash distilled) | 77–80 | 97.79 | 0.28 | 1.77 | 0.00 | 0.16 |
| Technical Grade | 68–80.5 | 97.09 | 0.17 | 1.75 | 0.13 | 0.47 |
| Reagent Grade | 81–82 | 99.69 | 0.05 | 0.13 | 0.03 | 0.09 |

The results shown in Table 1 indicate that by the practice of my process, purification of the reaction product is not necessary to obtain high quality fluorenone. Since one use for fluorenone is to make bisphenol therefrom having the formula my process permits one to go directly from fluorene to fluorenone and then to the bisphenol of fluorenone by a continuous process. What is additionally important is that the dimethylsulfoxide which is employed can readily be recovered and recycled with essentially no loss thereof.

The bisphenol described above can be employed to make resins. Thus, one use for this bisphenol is to react the latter with phosgene to make polycarbonate resins thereof which have application in molding operations, for instance, as housings for typewriters, appliances, motors, etc. The bisphenol derived from fluorenone when incorporated in polymers imparts to the latter inherent flame retardancy and high temperature ductility.

It will of course be apparent to those skilled in the art that in addition to the alkali-metal hydroxide employed above, other alkali-metal hydroxides can be used without departing from the scope of the invention. In addition, variations in the concentrations of the reactants and in the alkali-metal hydroxide solution can also be employed within the scope of the invention. Additionally, in place of molecular oxygen, one can also employ air, but this will slow down the rate of reaction. The rate of passage of the air can be varied widely and will depend on the desired rate of reaction with the fluorene; rates of from 5 to 1,000 ml. per minute are advantageously employed and are not a critical feature of the invention.

What I claim as new and desire to secure by Letters Patent of the United States is:

1. The process for preparing fluorenone which comprises reacting at a temperature ranging from ambient temperature to 100°C. a solution of fluorene in dimethyl sulfoxide with molecular oxygen in the presence of an alkali-metal hydroxide which is present in a positive amount up to 5.0 mol percent based on the molar concentration of the fluorene.

2. The process as in claim 1 wherein the alkali-metal hydroxide is sodium hydroxide.

3. The process as in claim 1 wherein the alkali-metal hydroxide molar concentration is from about 0.01 to 5.0 mol percent based on the molar concentration of the fluorene.

* * * * *